Patented Nov. 24, 1953

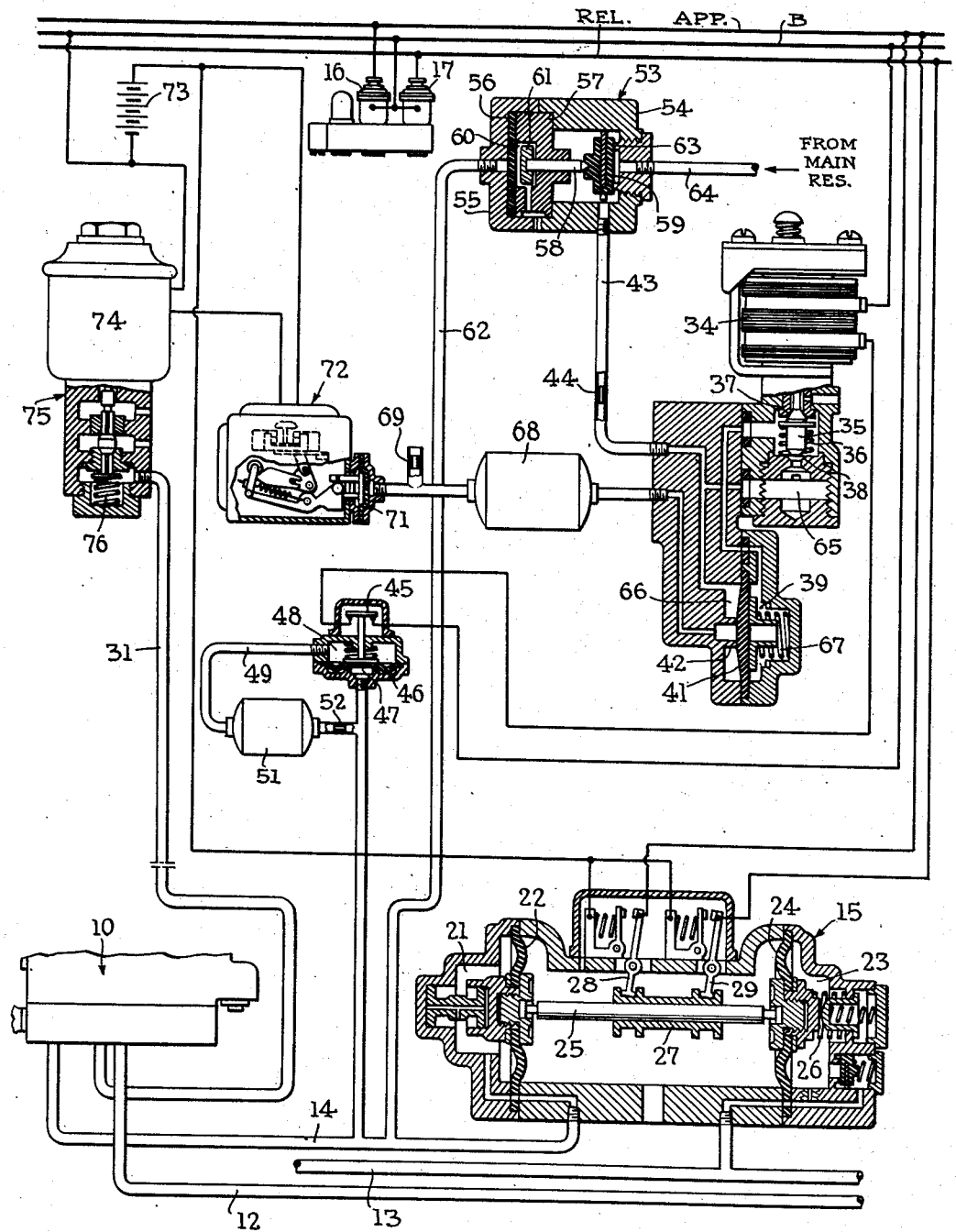

2,660,482

UNITED STATES PATENT OFFICE 2,660,482

CIRCUIT FAILURE PROTECTION DEVICE

John Van Varick Elsworth, Watertown, N. Y., assignor to The New York Air Brake Company, a corporation of New Jersey Application March 28, 1952, Serial No. 279,107

2 Claims. (Cl. 303—26)

This invention relates to air brakes and particularly to safety systems for electro-pneumatic brakes. Specifically the invention is concerned with a circuit failure protection device of the type described and claimed in applicant's earlier patent, No. 2,527,920 which issued on October 31, 1950. As a basis for disclosing the principle of the invention, it will be described as applied to the 24-RL brake equipment which is a commercial standard familiar to persons skilled in the art.

Basically this equipment is a dual brake system in which a complete automatic brake system and a complete electro-pneumatic straight air system exist side by side throughout the train. They operate the same brake cylinders through the same relays. They are controlled by the same engineer's brake valve, which may be set to operate the straight air system or the automatic system by shifting a two-position selector.

A few characteristics are of present importance, and will be mentioned. The automatic brake pipe retains all its usual characteristics. Hence, a break-in-two will inevitably cause an emergency application. Moreover, no matter how the selector is set, the engineer's brake valve always has one and the same emergency position, which will produce an automatic emergency position, which will produce an automatic emergency application. Hence, the major safety factors characteristic of automatic operation are always available, and are in no way dependent on any electrical function or straight-air function. The system loses nothing by the presence of the electro-pneumatic straight-air system.

The straight-air pipe is divided into car length units by chokes, though it is connected continuously throughout the train. The pressure in each unit is controlled by an electrically actuated inlet valve and an electrically actuated discharge valve. All such units are controlled by a master controller located at the head of the train. Since it is impracticable to operate the electrical part of the system on a closed circuit basis, the electrical part of the system cannot have a "fail safe" characteristic, and since the car-lengths of the straight air pipe are semi-isolated, units comprising more than one car, cannot be properly controlled by adjacent cars, in the event of failure of some electrically operated valve.

Trains equipped with the 24-RL brake are operated on the straight-air principle under normal conditions. The engineer's brake valve is set to establish a desired pressure in the control pipe. This pressure puts the master controller into action, and the latter through electrically actuated application and release valves establishes a related pressure in the straight-air pipe. The pressure so established exercises a follow-up or neutralizing effect on the master controller, so that establishment of the desired straight-air pipe pressure puts the master controller in balance, whereupon its action ceases.

The circuit failure protection device described in applicant's earlier patent mentioned above avails of the fact that if there is leakage from the straight air pipe during a brake application, a cyclic functioning of the master controller will result. If this cycling becomes too rapid as would be indicative of a dangerous condition, an electrically controlled safety device operates to produce an automatic brake application.

According to applicant's earlier patent, a magnet valve is actuated each time the master controller moves to energize an application magnet, thus cyclic operation of the master controller causes cyclic operation of the magnet valve. The magnet valve controls the flow of air from a pressure source such as the locomotive main reservoir to a volume which is constantly vented at a restricted rate. As long as the period between the cycles is sufficient for the pressure in the volume to be dissipated, the safety control device does not operate to produce an automatic application of the brakes. According to the present invention, the pressure fluid is supplied to the control volume under a pressure head which varies inversely relatively to the force with which the brakes are applied. Thus when a heavy application is in effect the control volume is charged at a slower rate than when a light application is in effect. In this way, with a heavy application of the brakes the frequency with which the master controller cycles must be higher to cause the safety device to function than would be necessary if a light application were in effect. Thus the response of the safety device is not affected by pressure head in the straight-air pipe.

By use of the present invention it is possible to make a closer selection between a system which is in safe operating condition and one which is in unsafe operating condition than was possible by use of the apparatus described and claimed in applicant's patent mentioned above.

While the invention is illustrated and will be described as it is embodied in the 24-RL brake equipment, it will be apparent to those skilled in the art that the invention can be used in the same or similar form with other brake systems.

The invention will be described having reference to the accompanying drawing which is a diagram of that portion of the 24-RL equipment which is affected by the invention. Certain parts of this brake equipment have been omitted from the drawing for the sake of clarity.

A portion of the engineer's brake valve appears in elevation at 10. The engineer's brake valve is convertible for operation selectively on the straight-air principle and the automatic principle, and when set for operation on the automatic principle operates the brakes by controlling the pressure in the normally charged brake pipe 12. When set to operate on the electro-pneumatic straight-air principle, the engineer's brake valve 10 controls the pressure in the straight-air pipe 13. It does so indirectly by controlling the pressure in a control pipe 14 sometimes called the "number eleven" pipe because that happens to be the identifying number cast on the pipe bracket of the engineer's brake valve.

The pressure in pipe 14 controls the operation of a master controller 15 which, in the example illustrated, is an electric switch controlling application and release magnet valves which in turn exercise control on the pressure in the straight-air pipe. These magnet valves are located at intervals throughout the train. One such application magnet valve is shown at 16 and the related release magnet valve at 17.

The primary function of the valves 16 and 17 is to establish and dissipate pressure throughout the length of the straight-air pipe 13. In accomplishing this function they may operate in any of the ways known in the art and since their function is familiar, this detail is not illustrated.

The magnet valves are controlled by the controller 15 through a three-wire circuit which extends throughout the train and comprises the B wire designated by the letter B, the application wire designated by the legend App. and the release wire designated by the legend Rel.

The pipe 14 leads to a chamber 21 at the left of an actuating diaphragm 22. The straight-air pipe leads to a chamber 23 at the right of a neutralizing or follow-up diaphragm 24. The centers of the diaphragms are connected together by a rod 25 whose motion actuates switches hereinafter mentioned. If pressure in pipe 14 is raised, diaphragm 22 moves to the right against the resistance of a biasing spring 26. If pressure is immediately developed in the straight-air pipe 13 (as should be the case), pressure in chamber 23 balances that in 21 and the spring 26 moves the rod 25 and the diaphragms in the reverse direction.

After pressure has been established in the straight-air pipe, lowering of the pressure in the pipe 14 and consequently in chamber 21 will cause a further reverse movement of the diaphragms.

Rod 25 carries a collar 27 which actuates the application switch arm 28 and the release switch arm 29 simultaneously both in circuit closing directions. The coacting contacts are so contrived that the effect is first to energize and close the release magnet valve 17 and thereafter energize and open the application magnet valve 16. That, of course, is what produces the rise of pressure in the straight-air pipe 13. Under "lap" conditions the release magnet valve remains energized but the application magnet valve is de-energized.

It is apparent from what has just been said that if an engineer attempts to make an application, and there is a break in the straight-air pipe or a serious leak therefrom, or if release magnet valves fail to function or application magnet valves fail to function, there will be a disturbance of the operation of the master controller 15. Malfunctions short of complete circuit failure (against which other safeguards are interposed), cause the master controller 15 to cycle that is, cause it to reciprocate or operate recurrently. The invention makes use of this recurrent operation or cycling to operate the service application valve in the engineer's brake valve 10 and thereby produce an automatic service application.

Operation of the service application valve is effectuated by venting a pipe 31 known in the industry as the "number ten pipe". So far as here material, the venting of the pipe 31 produces an automatic service application. The term "automatic" is here used in the technical sense to mean a brake application produced by the automatic side of the system.

A winding 34 is connected between the line B and the application line so that every time the master controller 15 functions, the winding 34 is energized. The armature in the winding 34 operates a double beat poppet valve 35, which is biased by a coil compression spring 36 toward an exhaust seat 37 and away from an inlet seat 38. The valve 35 controls the pressure in the chamber 39 behind a combined flexible diaphragm and valve 41.

The valve 41 seats against an annular seat 42 and controls flow from a pressure connection 43 through the choke 44. A normally closed switch 45 is connected in series with the winding 34. This switch includes a flexible diaphragm 46 which defines working spaces 47 and 48. The spaces 47 and 48 are in communication through a connection 49. Space 47 is in direct communication with the control pipe 14. A volume 51 and choke 52 retard the charging of space 48, thus when pressure is first developed in the control pipe 14 the switch 45 is opened by charging of space 47. It closes after reservoir 51 and space 48 are sufficiently charged. The winding 34 cannot be energized when this switch is open and a time delay is thus imposed in order that straight-air pipe pressure may develop normally. The apparatus which has been described above is conventional and no claim is directed to this equipment apart from the invention disclosed in this specification.

The connection 43 is supplied with pressure fluid from the main reservoir under control of a pilot valve 53. Pilot valve 53 includes a main body portion 54 and a cap 55. Clamped between the body portion and the cap are a flexible diaphragm 56 and a guide block 57. A closely fitted push rod 58 is slidable in the guide block 57 and at its end remote from the diaphragm 56 engages a valve 59. Stem 58 has a head portion 61 on its end adjacent to diaphragm 57. The space 60 between the diaphragm 56 and the block 57 is vented to atmosphere. The face of the diaphragm opposite to the push rod 58 is subject to the pressure in the control pipe 14 to which it is connected by a pipe 62. Valve 59 has a valve seat 63 and controls flow from the main reservoir pipe 64 to the connection 43.

Pilot pressure from valve 53 is always present in space 65 beneath the inlet seat 38 and is also present in the annular space 66 to the left of the diaphragm 41. The diaphragm 41 is biased towards its seat by a coil compression spring 67. Thus when the winding 34 is de-energized, diaphragm valve 41 closes but each time that winding 34 is energized the valve 41 is open. Valve 41 remains open so long as the winding 34 is energized. Pressure fluid is supplied from the pilot connection 43 and the choke 44 past the valve 41 to a small reservoir or accumulator volume 68.

The reservoir 68 is constantly vented to atmosphere through a choke 69. The size of the chokes 44 and 69 are so coordinated that the choke 69 will substantially dissipate pressure in the volume 68 under normal operating conditions. The charging rate of flow to the volume 68 depends upon the pressure in connection 43 and upon the frequency with which the winding 34 is energized.

The pressure developed in the volume 68 reacts on the motor diaphragm 71 of a normally closed switch which is indicated by the reference numeral 72. The source of current for the lines APP., B and REL. is typified by the battery 73 and the switch 72 is arranged to control the circuit from this battery through the winding 74 of the magnet valve generally indicated at 75.

The valve 75 is biased to open by coil compression spring 76 and when open vents the pipe 31. It follows that the winding 74 is constantly energized and holds the valve 75 closed and that maintained closure is dependent upon integrity of the circuit.

The switch 72 is normally closed but will be open if the reservoir 68 is charged to a pressure above a certain predetermined maximum.

Operation of the device will be described assuming the electro-pneumatic system is being used.

A brake application is initiated by manipulation of the brake valve 10 to charge the control pipe 14. Charging of the control pipe 14 causes the diaphragm 22 of the master controller 15 to flex to the right, as seen in the drawings thus successively closing the release and application switches. Closure of these switches energizes the application and release magnets which in turn cause the straight-air pipe 13 to be charged. Initial charging of the control pipe 14 opens the switch 45 thereby inhibiting energization of the winding 34. Switch 45 closes when the volume 51 and the space 48 have been charged to a pressure above a selected minimum value. The size of the choke 52 is selected, so that under normal conditions the straight-air pipe pressure has sufficient time to develop and return the master controller 15 to lap position in which the application magnet is de-energized.

If straight-air pipe pressure fails to develop within this time period, the closure of switch 45 results in energization of the winding 34. This shifts the valve 35 to a position in which it interrupts the supply of pressure fluid to the space 39 and vents that space. The pressure fluid in the space 66 will move the valve diaphragm 41 from its seat 42 and flow to the volume 68. The rate of flow of the pressure fluid through the choke 44 to volume 68 varies in accordance with the pressure head existing in the connection 43.

This pressure head is controlled by the pilot valve 53 and varies inversely relatively to the pressure head in the control pipe 14. It will be apparent that the valve 59 is biased in its closing direction by the pressure fluid in connection 62 which reacts on the diaphragm 56. Valve 59 is biased to open by main reservoir pressure. The areas of the diaphragm 56 and the valve seat 63 are selected so that the desired relation between control pipe pressure and pilot pressure in the connection 43 is established.

The time during which charging of the volume 61 occurs is determined by the energization of the winding 34. If straight-air pipe pressure does not develop the master controller remains in application position and the winding 34 remains energized. Under these conditions charging flow to volume 68 is uninterrupted and will after a definite time interval, dependent upon the pressure head in the connection 43 cause the switch 72 to open and de-energize the winding 74 of the magnet valve 75. The pipe 31 will be vented when the valve 75 is de-energized and will cause an automatic brake application. The word "automatic" is used here to indicate that the brake application is initiated by the automatic brake equipment.

If straight-air pipe pressure develops sufficiently to return the master controller 15 to lap position the winding 34 will be de-energized and charging of the volume 68 will be discontinued.

If there is a leak from the straight-air pipe, it will cause a pressure differential to develop between control pipe pressure and straight-air pipe pressure thus moving the master controller 15 to application position. It will be apparent that the winding 34 is again energized and charging of the volume 68 will be resumed. The volume 68 is constantly vented at a restricted rate, and since the charging flow, under the conditions described above is intermittent, the time required to charge the volume 68, assuming a constant rate of charging flow, is determined by the frequency of the cycling of the master controller.

For any given size of leak from the straight-air pipe the frequency of the cycling of controller 15 will depend upon the pressure head in the straight-air pipe. Hence a minor leak might cause rapid recycling of the master controller 15 when a heavy application is made. The high control pipe pressure, however, will condition the pilot valve 53 so that a relatively low pressure head exists in the connection 43, therefore the charging rate will be decreased. It will be seen that the frequency of the cycling determines the time intervals when charging flow to volume 68 may occur and the pilot valve acts to control charging rate by varying the pressure head.

By varying the pilot pressure inversely relatively to control pipe pressure it is possible to compensate the safety device so that its operation is the same for a given size of leak from the straight air pipe regardless of the pressure in that pipe.

When the switch 72 has been opened and an automatic application of the brakes initiated by de-energization of the winding 74, the brakes may be released only after the two-position selector has been shifted to change the operation from the straight-air system to the automatic system. Thus, if the safety device applies the brakes, as it will if the electro-pneumatic straight-air system malfunctions, the train can proceed only if the engineer changes over to automatic operation.

What is claimed:

1. The combination of an electro-pneumatic brake system comprising a straight-air pipe; a pneumatically actuated master controller arranged to control pressure in said straight-air pipe and having pneumatically actuated follow-up means responsive to resulting pressure changes in said straight-air pipe; a control pipe for communicating controlling pressure to said controller; a reservoir having an inlet and a constantly open restricted vent; electrically controlled valve means energized by said master controller when said straight-air pipe is being charged and effective when energized to admit fluid under pressure from a source of pressure fluid to said inlet; a pressure controlled valve interposed between said inlet and said source, said valve being controlled by pressure in said control pipe to vary the pressure head at said inlet inversely relatively to control pipe pressure; brake applying means independent of said electro-pneumatic brake system; and means responsive to the development of pressure above a predetermined value and serving in response thereto to operate said brake applying means.

2. The combination defined in claim 1 in which said pressure controlled valve includes a valve member in said inlet; said valve member being biased in its opening direction by pressure in said source; and fluid pressure motor means actuated by pressure in said control pipe and serving when actuated to bias said valve member in a closing direction.

JOHN VAN VARICK ELSWORTH.

References Cited in the file of this patent

UNITED STATES PATENTS

| Number | Name | Date |
|---|---|---|
| 1,136,061 | Turner | Apr. 20, 1915 |
| 2,527,920 | Elsworth | Oct. 31, 1950 |